(12) United States Patent
Supikov et al.

(10) Patent No.: US 12,019,396 B2
(45) Date of Patent: *Jun. 25, 2024

(54) REAL TIME HOLOGRAPHY USING LEARNED ERROR FEEDBACK

(71) Applicant: Intel Corporation, Santa Clara, CA (US)

(72) Inventors: Alexey Supikov, Santa Clara, CA (US); Qiong Huang, San Jose, CA (US); Ronald T. Azuma, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/308,447

(22) Filed: Apr. 27, 2023

(65) Prior Publication Data

US 2023/0341815 A1 Oct. 26, 2023

Related U.S. Application Data

(63) Continuation of application No. 17/740,946, filed on May 10, 2022, now Pat. No. 11,650,542, which is a (Continued)

(51) Int. Cl.
*G03H 1/08* (2006.01)
*G03H 1/04* (2006.01)
(Continued)

(52) U.S. Cl.
CPC ......... *G03H 1/0808* (2013.01); *G03H 1/0402* (2013.01); *G03H 1/0486* (2013.01); *G06N 3/02* (2013.01); *G06N 3/067* (2013.01); *G06T 1/20* (2013.01); *G06T 7/0002* (2013.01); *G06T 7/66* (2017.01); *G06T 9/002* (2013.01);
(Continued)

(58) Field of Classification Search
None
See application file for complete search history.

(56) References Cited

U.S. PATENT DOCUMENTS 5,986,781 A * 11/1999 Long ............... G03H 1/041 359/9
6,906,839 B2 * 6/2005 Gerchberg ......... G03H 1/0808 359/279

(Continued)

OTHER PUBLICATIONS

Goodfellow, et al. "Adaptive Computation and Machine Learning Series", Book, Nov. 18, 2016, pp. 98-165, Chapter 5, The MIT Press, Cambridge, MA.

(Continued)

*Primary Examiner* — Anand P Bhatnagar
(74) *Attorney, Agent, or Firm* — Jaffery Watson Mendonsa & Hamilton LLP

(57) ABSTRACT

Techniques related to generating holographic images for a holographic heads up display are discussed. Such techniques include application of a machine learning model to the target image to generate data that is used to enable the determination of a phase pattern via an iterative propagation feedback model. The iterative propagation feedback model is used to generate a feedback strength value, which is then used to generate a phase diffraction pattern for presentation at a holographic plane of the heads up display.

20 Claims, 7 Drawing Sheets

Related U.S. Application Data continuation of application No. 17/691,579, filed on Mar. 10, 2022, now Pat. No. 11,573,528, which is a continuation of application No. 16/712,779, filed on Dec. 12, 2019, now Pat. No. 11,378,915.

(51) Int. Cl.

| | | |
|---|---|---|
| *G06N 3/02* | (2006.01) | |
| *G06N 3/067* | (2006.01) | |
| *G06T 1/20* | (2006.01) | |
| *G06T 7/00* | (2017.01) | |
| *G06T 7/66* | (2017.01) | |
| *G06T 9/00* | (2006.01) | |
| *G06T 19/00* | (2011.01) | |

(52) U.S. Cl.
CPC ... *G06T 19/006* (2013.01); *G03H 2001/0428* (2013.01); *G03H 2001/0816* (2013.01)

(56) References Cited

U.S. PATENT DOCUMENTS

| | | | | |
|---|---|---|---|---|
| 7,782,510 B2* | 8/2010 | Wilson | ............... | G03H 1/0808 |
| | | | | 359/9 |
| 7,873,812 B1 | 1/2011 | Mimar | | |
| 8,085,453 B2* | 12/2011 | Christmas | ............ | G03H 1/0808 |
| | | | | 359/9 |
| 9,310,768 B2* | 4/2016 | Rakhovsky | ......... | G03F 7/70408 |
| 10,528,864 B2 | 1/2020 | Dally et al. | | |
| 10,571,862 B1* | 2/2020 | Alon-Braitbart | .... | G03H 1/2294 |
| 10,684,589 B2* | 6/2020 | Yurt | ......................... | G03H 1/12 |
| 10,838,192 B2* | 11/2020 | Ozcan | ................. | G03H 1/0443 |
| 10,860,922 B2 | 12/2020 | Dally et al. | | |
| 10,872,745 B2* | 12/2020 | Yamamoto | ............ | H01J 37/222 |
| 10,891,538 B2 | 1/2021 | Dally et al. | | |
| 2002/0060831 A1* | 5/2002 | Gerchberg | ........... | G03H 1/0808 |
| | | | | 359/237 |
| 2010/0277566 A1* | 11/2010 | Cable | ................... | H04N 9/3173 |
| | | | | 348/40 |
| 2012/0116703 A1* | 5/2012 | Pavillon | ............... | G03H 1/0866 |
| | | | | 702/70 |
| 2013/0120813 A1* | 5/2013 | Cowling | ................. | G03F 7/703 |
| | | | | 359/9 |
| 2016/0062947 A1 | 3/2016 | Chetlur et al. | | |
| 2018/0046906 A1 | 2/2018 | Dally et al. | | |
| 2018/0181062 A1* | 6/2018 | Yurt | ......................... | G03H 1/12 |
| 2019/0317451 A1* | 10/2019 | Supikov | ................ | G06F 18/214 |

OTHER PUBLICATIONS

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Nicholas Wilt, "The CUDA Handbook; A Comprehensive Guide to GPU Programming", Book, Jun. 22, 2013, pp. 41-57, Addison-Wesley Professional, Boston, MA.

Stephen Junkins, "The Compute Architecture of Intel Processor Graphics Gen9", paper, Aug. 14, 2015, 22 pages, Version 1.0, Intel Corporation, Santa Clara, CA.

* cited by examiner

REAL TIME HOLOGRAPHY USING LEARNED ERROR FEEDBACK

CROSS-REFERENCE

This is a continuation application claiming priority to U.S. patent application Ser. No. 17/740,946, filed May 10, 2022, which is a continuation of U.S. application Ser. No. 17/691,579, issued as U.S. Pat. No. 11,573,528, which is a continuation of U.S. patent application Ser. No. 16/712,779, filed Dec. 12, 2019, issued as U.S. Pat. No. 11,378,915, which is hereby incorporated herein by reference.

BACKGROUND

Holographic display devices may present holographic images in a variety of applications including automotive heads up displays (HUDs), smart projectors, augmented reality (AR) headsets, virtual reality (VR) displays, and others. Such holographic display devices have advantages over other displays including an inherent ability to focus light at different distances, very high light efficiency, and small size, to name a few. In the context of presenting holographic images, a spatial light modulator (SLM) is a key component. An SLM has many small pixels that are capable of modulating either the phase of light or its amplitude, but not both. Although devices that combine both phase and amplitude modulation are possible, technical constraints make such devices large, costly, and extremely complex. Therefore, SLMs that modulate only one of phase or amplitude are typically used with phase modulation being employed more frequently. Such SLMs with high resolution phase modulation enable the development and production of compact and energy efficient holographic devices capable of producing images for automotive HUDs, smart projectors, AR, VR, and other contexts.

Notably, even in the context of projecting a single planar image, generating a high quality hologram requires modulating both light intensity and phase. It is a hard problem that requires complex and expensive hardware to solve. Therefore, current practical applications employ simple cost efficient hardware that modulate phase of light (phase SLM) only, relying on interference phenomena (constructive or destructive) to control the light intensity in the image domain. Another benefit of the phase SLM is high light efficiency, since all the light passes through the SLM without being attenuated (i.e. amplitude modulated). Simplifying the hardware comes at very high computation cost as high quality and high light efficiency algorithms typically use iterative constrained optimization approaches and generating high quality diffraction pattern on phase-only SLM requires many iterative steps to bring down the error. Therefore, current techniques for generating holographic diffraction images are computationally expensive and have other limitations. It is with respect to these and other considerations that the present improvements have been needed. Such improvements may become critical as the desire to present holographic images becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
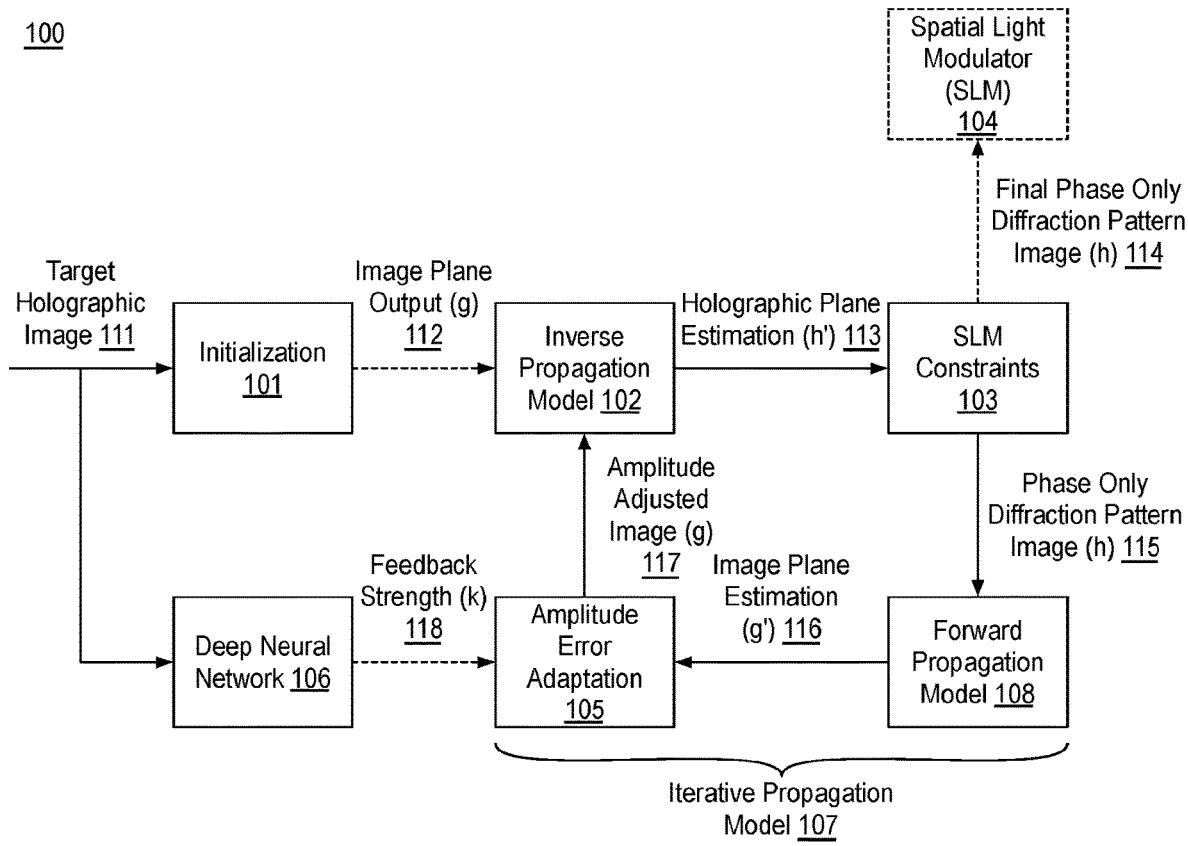
FIG. 1 illustrates an example system for generating diffraction pattern image data based on a given holographic imaging arrangement and target holographic image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE)

devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to holographic imaging and, in particular, to generating diffraction pattern image data corresponding to a given holographic imaging arrangement and a target holographic image using an iterative propagation feedback model such that the feedback strength is determined by applying a pretrained deep neural network to the target holographic image.

In various contexts, a holographic imaging arrangement may be employed to display holographic images to a user. The holographic imaging arrangement may include a light source, a spatial light modulator (SLM), various optical elements, and the spatial arrangement of such components. As used herein, the term holographic imaging arrangement indicates an arrangement of any components for the display of a holographic image to a user. The term holographic image indicates any hologram that is displayed to a user including 2D or planar holograms, 3D holograms, or holograms projected onto a screen. Notably, such holographic images can be seen with the naked eye and are generated using interference patterns generated by diffraction of light. Furthermore, a target holographic image is provided for eventual display to the user using the holographic imaging arrangement. The target holographic image, as the name suggests, is the image that is to be shown to the user via the holographic imaging arrangement.

As discussed, to generate a holographic image that closely matches the target holographic image, a SLM displays a diffraction pattern image. Coherent light is emitted onto the SLM displaying the diffraction pattern image, which modifies and reflects or transmits the light toward a viewing space based on the diffraction pattern image data provided to the SLM. As used herein, the terms image (e.g., diffraction pattern image, holographic image, etc.) are used to indicate both the image to be displayed (e.g., via a display and/or to a user) and the image data, in any format, that is provided to a display to generate the image, to a deep neural network or other processing module, etc. for processing, and so on. In some contexts, the former may be described as an image (e.g., diffraction pattern image) while the latter may be described as image data (e.g., diffraction pattern image data used to generate a diffraction pattern image). However, the term image is used for both herein while context makes clear which structure is being descried.

At a particular distance from the SLM (which may include optics between the SLM and the viewing space), the resultant wavefront generates a holographic image at an image plane. As used herein the term image plane indicates a plane at which the holographic image is to be viewed by a user while the term holographic plane (or hologram plane) indicates the plane at which the diffraction pattern image is to be displayed. As discussed, the holographic image in some contexts may be projected onto a screen (which may be provided at the image plane). The holographic image may be planar or it may have depth to provide a 3D hologram. As used herein, the term holographic image indicates a planar or 3D holographic image or hologram. For example, the resultant light field from the SLM may focus to an individual plane or to multiple adjacent planes to generate 3D imagery. Furthermore, time multiplexing techniques may be used to generate the effect of 3D imagery by refreshing planar or 3D holographic images at a rate faster than what is noticeable to the human eye.

The techniques discussed herein accelerate generation of the diffraction pattern images or image data by adaptively generating a feedback strength for use in an iterative propagation feedback model that is, in turn, used to determine the diffraction pattern image from the target holographic image such that the feedback strength is generated by applying a pretrained deep neural network (DNN) or machine learning model to the target holographic image. Notably, iterative propagation models without feedback may provide iterations that replace an amplitude plane of a current phase and amplitude image plane estimation with the amplitude plane of the target holographic image. Iterative propagation feedback models (or iterative propagation models with feedback) instead replace an amplitude plane of a current phase and amplitude image plane estimation with the amplitude plane of the target holographic image modified by a product of a feedback strength and a correction term. The correction term (or correction factor) is a difference between the target holographic image and a current phase and amplitude image plane generated using a forward propagation model as discussed herein.

As discussed, the feedback strength for use in the iterative propagation feedback model is generated based on applying a pretrained DNN to the target holographic image. The feedback strength generated based on applying the pretrained DNN provides an optimal or near optimal feedback strength that reduces the number of iterations of the iterative propagation feedback model that are needed to meet a particular performance metric such as peak signal to noise ratio and/or to provide improved performance after completion of a fixed number of iterative propagation feedback model iterations.

The inventors have identified that use of single, static feedback strength may provide improvements (in terms of fewer iterations to meet the same PSNR or better PSNR with the same number of iterations) over no feedback (i.e., k=0) for some target holographic images but other target holographic images have decreased performance with respect to no feedback. Furthermore, the inventors have identified that, for different target holographic images, different feedback strength provide optimal performance (again in terms of fewer iterations to meet the same PSNR or better PSNR with the same number of iterations). Notably, when plotted against feedback strength (e.g., ranging from 0 to 1), the PSNR for particular target holographic images after a constant number of iterations (e.g., 20), typically has a peak at a particular feedback strength, which may vary from image to image. It is noted that the peak is consistently above the PSNR at k=0 (i.e., no feedback is used) although not all k values are above PSNR at k=0. Furthermore, the particular optimal feedback strength for each target holographic image varies from image to image. As discussed further herein, by adaptively selecting the feedback strength, improved performance (improved PSNR at a constant number of iterations or fewer iterations to reach the same PSNR) is attained. Such improvement over k=0 (i.e., no feedback) typically provide the same PSNR with 50% fewer iterations, which saves substantial compute resources and power. Notably, the increased computational overhead for determination of the adaptive feedback strength is comparably insubstantial as the DNN is relatively simple and may be implemented to determine a single floating point feedback strength. Notably, the optimal feedback strength is different for different target holographic images and different classes of target holographic images. Furthermore, the optimal feedback strength values tend to group tightly together for images having similar structure but do not correlate with integral image characteristics such as image energy.

FIG. 1 illustrates an example system 100 for generating diffraction pattern image data based on a given holographic imaging arrangement and target holographic image, arranged in accordance with at least some implementations of the present disclosure. As shown in FIG. 1, system 100 includes an initialization module 101, a deep neural network (DNN) module 106, and an iterative propagation model module 107, which includes an inverse propagation model module 102, an SLM constraints module 103, a forward propagation model module 108, and an amplitude error adaptation module 105. System 100 may also include a spatial light modulator 104 (SLM) such as a phase only SLM 104. In other embodiments, SLM 104 may be implemented separately from system 100 and resultant final phase only diffraction pattern image 114 may be stored and/or transmitted to a remote SLM 104 for display.

As shown, system 100 receives target holographic image 111, which is to be presented to a user, and provides final phase only diffraction pattern image 114, generated based on target holographic image 111, to SLM 104 or another holographic display device such that SLM 104 is part of a holographic imaging arrangement used to present a holographic image or hologram to a user.

Figure 2:
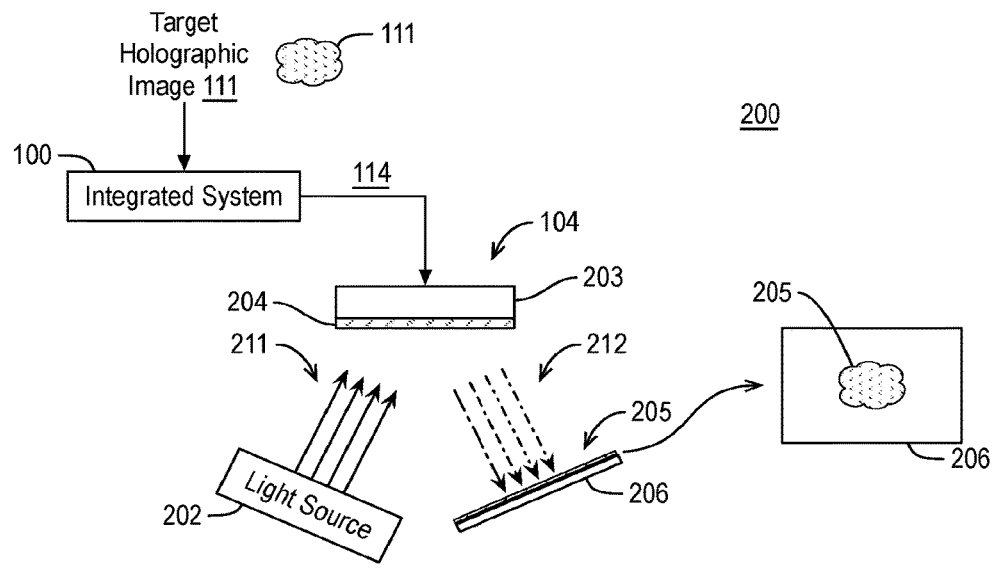
FIG. 2 illustrates an example holographic imaging arrangement.

FIG. 2 illustrates an example holographic imaging arrangement 200, arranged in accordance with at least some implementations of the present disclosure. As shown in FIG. 2, holographic imaging arrangement 200 includes system 100 (i.e., as an integrated system such as a computing device or portion thereof), SLM 104, light source 202, and optional screen 206. System 100 may be implemented in any suitable form factor device such as motor vehicle platform, a virtual reality headset platform, an augmented reality headset platform, a personal computer, a laptop computer, a tablet, a phablet, a smart phone, a digital camera, a gaming console, a wearable device, a display device, an all-in-one device, a two-in-one device, etc. For example, system 100 may generate a diffraction pattern image (diffraction pattern image data) as discussed herein and system 100 may include components for displaying the corresponding hologram or system 100 may transmit the diffraction pattern image data to another device for display of the hologram. As shown, in some embodiments, system 100 may be integrated into the same housing, onto the same motherboard, into the same system on a chip platform, etc. As used herein, the term integrated system indicates a system integrated into at least the same device package or housing.

As shown, holographic imaging arrangement 200 includes a light source 202 such as a laser light source that emits coherent light 211 onto or toward SLM 104. Optional optics may be provided between light source 202 and SLM 104. Furthermore, although illustrated with respect to SLM 104, any suitable holographic imaging device may be employed. SLM 104, based on final phase only diffraction pattern image 114 generates a corresponding diffraction image within a surface layer 204 of SLM, which is on a substrate 203. Notably, the diffraction image is provided at a holographic plane that is defined by surface layer 204. It is noted that the diffraction image displayed at the holographic plane of SLM 104 may have little or no resemblance to target holographic image 111 and a corresponding and resultant holographic image presented to a user at an image plane as discussed further below. For example, SLM 104 may include a reflective liquid crystal film that is pixelated (alterable at a pixel level) to provide a modulated image surface representative of final phase only diffraction pattern image 114. SLM 104 may include any number of pixels and have any size. For example, SLM may have 3, 4, or 6 micron pixels in surface layer 204 and surface layer 204 may be about 12×12 mm to 15×15 mm in surface area, although any pixel size and surface layer 204 area size may be employed.

Furthermore, surface layer 204 modulates, on a pixel-by-pixel basis, a phase of coherent light 211 to provide modulated light 212. For example, SLM 104 may modulate phase (e.g., is capable of modulating phase) and may be incapable of modulating amplitude. Such phase only SLMs may provide a compact form factor and high energy efficiency. Modulated light 212 may be characterized as phase modulated light, coherent pixelated light, etc. Notably, SLM 104 provides modulated light 212, which is modulated on a pixel-by-pixel basis. As shown, modulated light 212 propagates through space toward an optional screen 206 and modulated light 212 generates a holographic image 205, at an image plane that corresponds to optional screen 206 or at an image plane that is in space, that is determined by final phase only diffraction pattern image 114 (and, ultimately, target holographic image 111).

Holographic image 205 is generated based on an interference pattern provided by modulated light 212 that is focused at a particular distance from SLM 104. In the context of phase modulation, the limitation of no amplitude modulation means amplitude variation within holographic image 205 is generated based on constructive and destructive interference as provided by final phase only diffraction pattern image 114. Although illustrated with respect to a planar holographic image 205, holographic imaging arrangement 200 and the techniques discussed herein may be employed to generate 3D holographic images. Notably, such 3D holographic images may also be presented at an image plane, which is distinct from a holographic plane. Without loss of generality, the disclosed techniques are typically discussed with respect to generating a planar holographic image (e.g., a given distribution of light intensity on a plane at a certain distance from SLM 104) but such techniques are applicable to planar or 3D holographic imaging techniques. In some implementations, distributions of intensities in a volume may be achieved by time multiplexing multiple planar images at different distances to generate a 3D volumetric hologram.

Holographic image 205 seeks to replicate target holographic image 111 as closely as possible. Holographic image 205 may be any size such as about 5×5 inches without use of intervening optics, depending on the size of the pixels of SLM 104 and the distance of holographic image 205 from SLM 104. Screen 206 may be a standard screen surface reflective to all or most wavelengths of light or screen 206 may be reflective only to a band of light corresponding to the band of coherent light 211 and modulated light 212 while being translucent with respect to other bands of light and, in particular, to other bands of visible light. For example, screen 206 may be glass (e.g., a windshield of a car) that has elements that are (largely) invisible to the naked eye but reflect a narrow band of wavelengths around those of coherent light 211 and modulated light 212. In some embodiments, screen 206 includes optical elements that further project and/or reflect modulated light 212 such that, for example, holographic image 205 appears to be over the hood of an automobile.

Holographic imaging arrangement 200 may be employed in any context such as automotive heads up displays (HUDs), augmented reality (AR) displays, virtual reality (VR) displays, multi-focal head mounted displays (HMDs), etc. Such holographic display devices have advantages over other displays including an inherent ability to focus light at different distances, very high light efficiency, small size, etc. Furthermore, final phase only diffraction pattern image 114 may be transmitted from system 100 to SLM 104 or another component of a holographic display using any suitable technique or techniques. In some embodiments, system 100 is local to SLM 104 such that they are implemented in the same device. In other embodiments, system 100 is remote from SLM 104 and final phase only diffraction pattern image 114 is transmitted to SLM 104 via wired or wireless communication. In some embodiments, final phase only diffraction pattern image 114 is stored in a memory accessible to SLM 104.

Returning to FIG. 1, system 100 receives target holographic image 111. As used herein, the term image generally may refer to imagery that may be presented via a display and/or viewed by a user or the corresponding image data, the latter of which may be distinguished, as needed based on context by adding the term data. Target holographic image 111 may include any suitable picture, video frame, or the like or any data structure representing a picture or video frame at any suitable resolution. In an embodiment, target holographic image 111 is single channel image data having a single value (e.g., luma) for pixels thereof such that each value indicates a desired amplitude or brightness for the pixel in a displayed hologram. In other embodiments, target holographic image 111 has multiple color channels such as an R (red) channel, a G (green) channel, and a B (blue) channel with respective pixel values. Target holographic image 111 may correspond to any desired holographic image or hologram to be presented to a user.

As shown, target holographic image 111 is received by initialization module 101 and by DNN module 106. Initialization module 101 generates, using any initialization techniques, an image plane output 112 ($g$). Herein, g denotes an image at the image plane and h indicates an image at the holographic plane. Furthermore, the terms image plane and holographic plane may be used as shorthand for the image at the plane (or estimated at the plane) using iterative propagation model module 107. In some embodiments, initialization module 101 converts target holographic image 111 to multi-channel image data having at least an amplitude component channel and a phase component channel for each pixel or at least some pixels (optional re-sampling may be performed) of target holographic image 111. Notably, target holographic image 111 may include only amplitude values (e.g., luma values) while holographic propagation models and display devices operate on 2-channel data such that each pixel has an amplitude value and a phase value. The amplitude and phase values may be provided using any suitable technique or techniques. In an embodiment, the amplitude value and a phase value are explicitly provided as pixel-by-pixel values that may have any suitable ranges. In an embodiment, each pixel-by-pixel amplitude value and phase value are represented as a complex number where the magnitude of the number represents amplitude and the angle between real axis and the vector determined by the complex number represents phase, as is known in the art.

As discussed, SLM 104 may provide final phase only diffraction pattern image 114 such that the amplitude of each pixel of final phase only diffraction pattern image 114 is a normalized value such as one while the phase of each pixel may be any value within a particular range. In an embodiment, the phase range is 0 to $2\pi$, however, any range may be used. The discussed multi-channel image data of image plane output 112 (e.g., an initialized image plane output) may be generated from target holographic image 111 using any suitable technique or techniques such as copying the amplitude component from the single channel of target holographic image 111 while values of the phase component channel are generated using any suitable technique or techniques such as preselecting a phase pattern, generating a random phase pattern, or the like. In an embodiment, converting target holographic image 111 to the multi-channel image data of image plane output 112 includes setting each amplitude value of the amplitude component to a corresponding value of target holographic image 111 and applying a phase pattern to generate phase values of the phase component.

Furthermore, target holographic image 111 is provided to DNN module 106. DNN module 106 receives target holographic image 111 (e.g., a single channel image) and generates a feedback strength (k) 118 based on application of a pretrained deep neural network to target holographic image 111. In some embodiments, the DNN implemented by DNN module 106 is applied directly to target holographic image 111. In other embodiments, target holographic image 111 is downsampled prior to application of the DNN implemented by DNN module 106. For example, the DNN may operate on (and be pretrained in a like manner) downsampled target holographic image data. The downsampling may be any downsampling factor such as a factor of four (e.g., downsampling by a factor of two in both the horizontal and vertical dimensions).

The pretrained deep neural network may be any suitable deep neural network such as a network having any number of convolutional layers and a fully connected layer after the convolutional layers. For example, each convolutional layer may generate any number of feature maps by applying a corresponding number of kernels (or filters) to regions of feature maps from the preceding convolutional layer (or from the input target holographic image 111 in the case for the first convolutional layer). Each convolutional layer or some convolutional layers may also provide feature map size reduction. As used herein, the term convolutional layer indicates a layer of a DNN that provides convolutional filtering as well as other optional related operations such as rectified linear unit (ReLU) operations, pooling operations, and/or batch normalization (BN) operations. As discussed, the convolutional layers are followed by one or more fully connected layers that take feature maps from the final convolutional layer and generates feedback strength 118.

Figure 3:
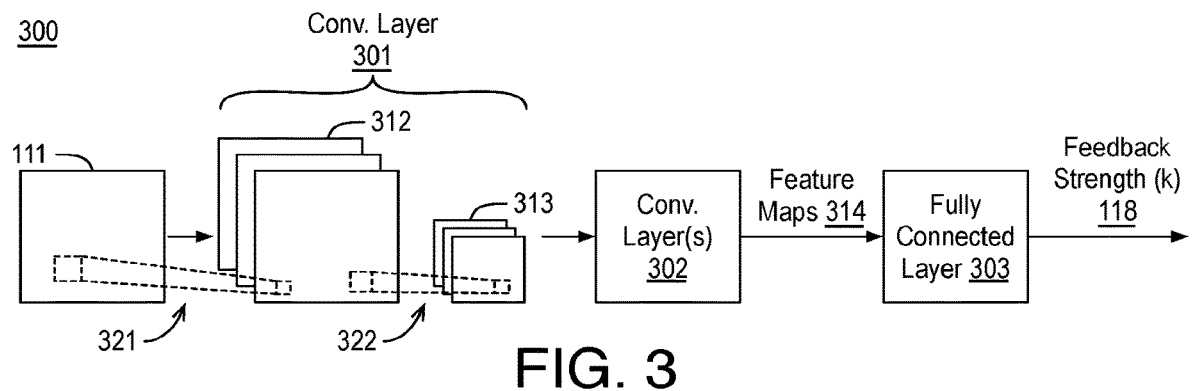
FIG. 3 illustrates exemplary implementation of a deep neural network to generate a feedback strength based on a target holographic image.

FIG. 3 illustrates exemplary implementation of a deep neural network 300 to generate feedback strength 118 based on target holographic image, arranged in accordance with at least some implementations of the present disclosure. As shown in FIG. 3, target holographic image 111 may include a single channel representative of desired luma values at an image plane. DNN module 106 applies pre-trained DNN 300 to target holographic image 111 to generate feedback strength 118. As shown, feedback strength 118 may be a single value such as a single floating point value represented by 32 bits or 16 bits that may range from 0 to 1, inclusive.

DNN 300 may implement any number of convolution layers 301, 302. As shown with respect to convolution layer 301, one, some, or all of convolution layers 301, 302 may include a convolutional layer operation 321 (illustrated with respect to a single convolutional operation) that applies any number of convolutional kernels or filters to regions of target holographic image 111 to generate a corresponding number of feature maps 312. As used herein, the term feature map indicates any suitable data structure indicating features, as represented by feature or response values within the map. For example, a feature map may include a 2D array of values indicative of such features. Such feature maps may be characterized as features, feature, maps, response maps, etc. Furthermore, one, some, or all of convolution layers 301, 302 may include a pooling layer operation 322 (illustrated with respect to a single pooling or downsampling operation) that may select a maximum value or otherwise pool values from regions of feature maps 312 to generate feature map 313. One, some, or all of convolution layers 301, 302 may further include ReLU operations and/or BN operations, as is known in the art.

DNN 300 may further include any number of convolution layers 302 that each process input feature maps such as feature maps 313 to generate output feature maps as discussed with respect to convolution layer 301. Such convolution layers 301, 302 may further implement other convolutional layer operations such as rectified linear units (ReLU), batch normalization (BN) operations, etc. The final convolutional layer of convolution layers 302 provides feature maps 314 to one or more fully connected layers 303, which outputs a single value, feedback strength 118, for error feedback in determination of a phase only diffraction pattern image using an iterative propagation feedback model as discussed further herein below.

As discussed, DNN module 106 implements a DNN having a number of convolutional layers with each convolutional layer receiving target holographic image 111 or a preceding set of feature maps from a previous layer and each convolutional layer applying a predetermined number of convolution kernels having a predetermined size to the incoming data to generate feature maps. After all of the convolutional layers, the DNN includes one or more fully connected layers to receive the feature maps from the final convolutional layer and to generate feedback strength 118.

Based on the pre-training of the DNN, feedback strength 118 is generated as discussed, such that feedback strength 118 is used as a feedback strength or feedback coefficient for error feedback in determination of a phase only diffraction pattern image using an iterative propagation feedback model. Before turning to generation of a final phase only diffraction pattern image by application of an iterative propagation feedback model based on target holographic image 111 using feedback strength 118, discussion turns to pre-training of a DNN. The following DNN pre-training techniques may be applied to any DNN discussed herein.

Figure 4:
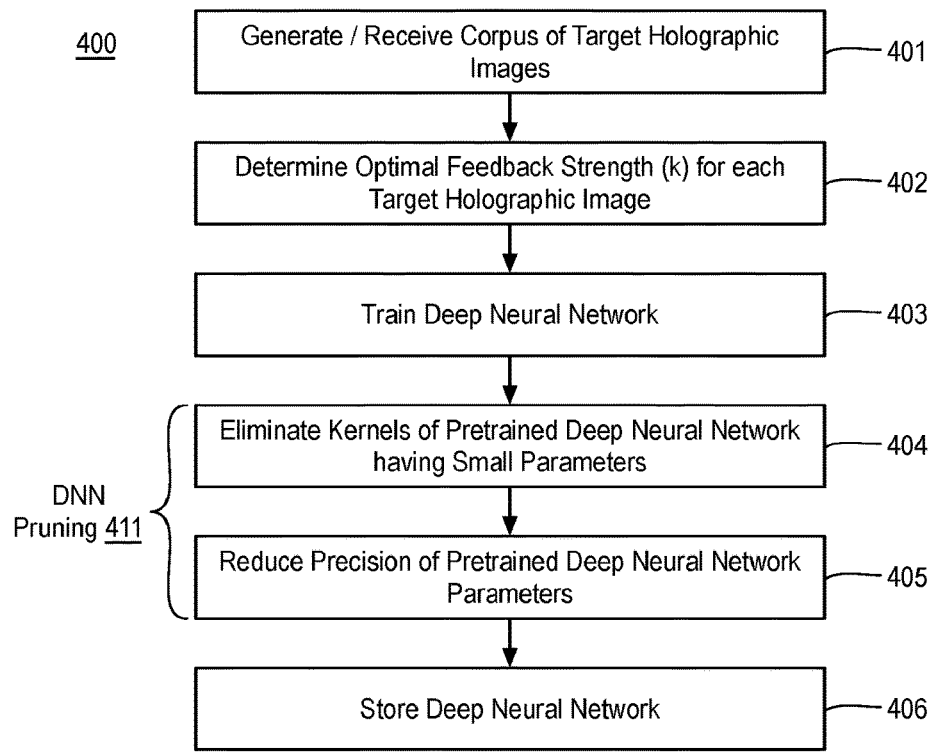
FIG. 4 illustrates an example process for pretraining a deep neural network to generate a feedback strength based on a target holographic image.

FIG. 4 illustrates an example process 400 for pretraining a deep neural network to generate a feedback strength based on a target holographic image, arranged in accordance with at least some implementations of the present disclosure. Process 400 may include one or more operations 401-406 as illustrated in FIG. 4. Process 400 or portions thereof may be performed by a device or system to generate a DNN for implementation as any DNN discussed herein.

Process 400 begins at operation 401, where a corpus of target holographic images is generated or received. The corpus of target holographic images may include any suitable target holographic images of any number. For example, the corpus of target holographic images may include a large corpus (thousands of images) corresponding to a variety of images to be presented to a user. Furthermore, the corpus of target holographic images may include a variety of objects, shapes, etc. to provide flexibility and robustness in the resultant DNN. In some embodiments, the training corpus includes target holographic images pertinent to a particular application such as symbols and imagery for an automotive heads up display.

Processing continues at operation 402, where an optimal feedback strength is determined for each target holographic image in the corpus. The optimal feedback strength (i.e., in a range of 0 to 1) may be determined using any suitable technique or techniques to any suitable level of granularity or precision such as a precision of one-hundredth (i.e., an optimal feedback strength for each target holographic image to the nearest 0.01). In some embodiments, brute force techniques are used such that the pertinent iterative propagation feedback model is implemented for each available optimal feedback strength and the feedback strength providing the fewest iterations to a target performance metric (e.g., PSNR) or the best PSNR based on a given number of iterations is selected. However, as discussed, performance versus feedback strength includes a peak and, therefore, optimization techniques such as a coarse to fine search may be employed to speed up the process. For example, multiple values at particular distances from each other may be tested (e.g., 0.0, 0.2, 0.4, 0.6, 0.8, 1.0) and the results may be used to locate the peak between the multiple values and the corresponding range may be subjected to the same process until an optimal feedback strength is determined.

Processing continues at operation 403, where the DNN is trained using the pairs of target holographic images and optimal feedback strengths. Training operation 403 may be performed using any suitable DNN training operations. For example, a DNN architecture may be defined and randomly or otherwise assigned weights may be applied to the convolutional layers and the fully connected layer(s) to initialize the DNN. In some embodiments, the DNN is a relatively simple convolutional neural network (CNN) including or followed by a fully connected layer. In some embodiments, the DNN has a ResNet structure with pre-activation ResNet blocks that take an image as an input and output a correlation coefficient.

A subset or an entirety of the training corpus of the target holographic images may then be provided to the DNN and a resultant error, using the ground truth optimal feedback strengths may be back propagated through the DNN to determine an updated DNN. Such training operations may be repeated until a convergence criterion such as resultant error being less than a threshold or a number of training epochs have been performed is met. In some embodiments, the trained DNN returns a strength value at a high precision such as to the nearest 0.01.

Operations 401-403 provide a pretrained DNN that may be implemented in any context discussed herein. In some embodiments, the resultant pretrained DNN may be compressed to provide a compressed pretrained DNN. Such compression may provide an advantageously lower computational and memory footprint for the DNN in implementation with minimal accuracy loss. For example, compressed DNNs that use pruned weights and/or reduced precision for the DNN model may provide reduced inference time during implementation. It is noted that the inventors have found an optimal feedback coefficient in the range of [0 . . . 1] range with a 0.01 precision provides enough precision or granularity to achieve optimal performance. In some embodiments, process 400 includes one or both of optional DNN pruning operations 411. In some embodiments, however, DNN pruning operations 411 may be bypassed.

Processing may continue at operation 404, where one or more kernels of the pretrained DNN having zero or small parameters may be eliminated. For example, each convolutional kernel of the pretrained DNN may be evaluated and those convolutional kernels with all zero filter weights are eliminated or discarded and those convolutional kernels having small filter weights are eliminated or discarded. Such a determination of small filter weights may be made by comparing each weight to a threshold, comparing a sum of absolute values of the weights to a threshold, comparing a sum of squares of the weights to a threshold, or requiring satisfaction of multiple of such thresholds. For example, use of both sum of absolute values and sum of squares may provide more robust kernel evaluation. In some embodiments, instead of eliminating or discarding convolutional kernels, convolutional kernel weights that are below a threshold may be set to zero.

Processing may continue at operation 405, where the accuracy of the weights of the pretrained DNN may be reduced. The accuracy may be reduced using any suitable technique or techniques. In some embodiments, the weights of the pretrained DNN are pretrained at a first accuracy or bit depth (i.e., 32 bits) and the accuracy or bit depth is reduced to a second accuracy or bit depth (i.e., 16 bits) lower than the first. In some embodiments, the weights of the pretrained DNN may be quantized to reduce the accuracy of the weights of the DNN.

Processing continues at operation 406, where the pruned DNN (e.g., having fewer kernels, weights, and/or reduced accuracy weights) or the pertained DNN generated at operation 403 is stored to memory for implementation as discussed herein.

Returning now to FIG. 1, as shown, initialized image plane output 112 and feedback strength 118 are provided to iterative propagation model module 107, which applies an iterative propagation feedback model based on target holographic image 111 (as it defines initialized image plane output 112) and using feedback strength value 118 to generate final phase only diffraction pattern image 114. As discussed, final phase only diffraction pattern image 114 is then presented at a holographic plane by SLM 104 and, ultimately, a corresponding final holographic image is generated at an image plane for viewing by a user.

Iterative propagation model module 107 may implement any iterative propagation model that includes feedback. Notably, the Gerchberg-Saxton algorithm, as used for computer generated holograms, does not implement feedback. The Fienup algorithm introduced an error mechanism using feedback with a constant feedback strength. As discussed, the Fienup algorithm improved convergence (e.g., providing the same error with fewer iterations or improved error with the same number of iterations) for some, but not all, target holographic images. The iterative propagation feedback model or iterative propagation model with feedback techniques discussed herein may be implemented with any iterative propagation model that includes feedback. As used herein, the term feedback indicates that, in the iterative model, an amplitude plane of a phase and amplitude image plane estimation is replaced with an amplitude image that is not only the amplitude image (or plane) of the target holographic image but is instead a sum of the amplitude image (or plane) of the target holographic image and an error term. The error term being a sum of the target holographic image and a product of feedback strength value 118 and a correction term including a difference between the target holographic image and the current phase and amplitude image plane. Such techniques are discussed further with respect to Equations (4) below. Notably, in iterative models without feedback, the amplitude image (or plane) of the phase and amplitude image plane estimation (i.e., the output from a forward propagation model) is replaced by the amplitude image of the target holographic image. In iterative models with feedback, the amplitude image (or plane) of the phase and amplitude image plane estimation (i.e., the output from a forward propagation model) is instead replaced by the amplitude image of the target holographic image modified by an error term having the characteristics just discussed.

As shown, inverse propagation model module 102 receives initialized image plane output 112 or an image plane output 117 ($g$) from a previous iteration. Initialized image plane output 112 or image plane output 117 ($g$) may include any data structure having an amplitude plane and a phase plane as discussed herein. For example, initialized image plane output 112 or image plane output 117 may be a complex number encoding amplitude and phase via magnitude and angle between real axis and the number's direction vector on the complex plane correspondingly. Notably, image plane output 117 provides an image plane estimation as adjusted by amplitude error adaptation using an error term as discussed further below.

At a first iteration, inverse propagation model module 102 applies an inverse propagation model to initialized image plane output 112 and, at subsequent iterations, inverse propagation model module 102 applies an inverse propagation model to image plane output 117 to generate a holographic image plane estimation 113 (h'). Holographic image plane estimation 113 may also include any data structure having an amplitude plane and a phase plane as discussed herein. It is noted that holographic image plane estimation 113 may have amplitude and phase planes such that neither is normalized. Notably, holographic image plane estimation 113 may not be presentable by SLM 104 in a meaningful way as SLM 104 is able to modulate phase but not amplitude.

The inverse propagation model provides translation from the image plane of a holographic imaging arrangement to the holographic plane. Thereby, the inverse propagation model estimates the holographic image (i.e., the holographic image at the holographic plane of SLM 104) that would be needed to generate initialized image plane output 112 or image plane output 117. The inverse propagation model may be any suitable inverse propagation model such that the inverse propagation model implemented by inverse propagation model module 102 is an inverse of the forward propagation model implemented by forward propagation model module 108. For example, the forward propagation model must be invertible. In the following Equations, Fraunhofer propagation model (e.g., FFT for forward propagation and IFFT for inverse propagation) is illustrated. However, any propagation model may be implemented.

In some embodiments, inverse propagation model module 102 applies an inverse propagation model as shown in Equation (1):

$$h'_n = FT^{-1}(g_{n-1}) \tag{1}$$

where $g_{n-1}$ is initialized image plane output 112 or image plane output 117, FT' is the inverse propagation model, and $h'_n$ is holographic image plane estimation 113.

Holographic image plane estimation 113 is received by SLM constraints module 103, which applies constraints to holographic image plane estimation 113 to generate phase only diffraction pattern image 115 (h) at intermediate iterations and final phase only diffraction pattern image 114 at a final iteration. Phase only diffraction pattern image 115 and final phase only diffraction pattern image 114 may be generated using any suitable technique or techniques. For example, the amplitude plane or information of holographic image plane estimation 113 may be discarded and the phase plane or information of holographic image plane estimation 113 may be normalized (to a range and precision that may be implemented by SLM 104). Notably, phase only diffraction pattern image 115 and final phase only diffraction pattern image 114 may be displayed by SLM 104 to generate an approximation of target holographic image 111 such that phase only diffraction pattern image 115 and final phase only diffraction pattern image 114 only have phase modulation (and do not have amplitude modulation). In some embodiments, final phase only diffraction pattern image 114 has only phase information (i.e., a phase plane) while phase only diffraction pattern image 115 may include both phase and amplitude information for use in iterative processing.

In some embodiments, where holographic image plane estimation 113 is a 2D array of complex numbers, SLM constraints module 103 applies SLM constraints as shown in Equation (2):

$$h_n = \frac{h'_n}{|h'_n|} \tag{2}$$

where $h'_n$ is holographic image plane estimation 113 and $h_n$ is phase only diffraction pattern image 115. As shown, the per-pixel complex values of holographic image plane estimation 113 may be normalized to generate phase only diffraction pattern image 115.

Phase only diffraction pattern image 115 is received by forward propagation model module 108. Forward propagation model module 108 applies a forward propagation model to phase only diffraction pattern image 115 to generate an image plane estimation 116 (g'). Image plane estimation 116 includes any data structure having an amplitude plane and a phase plane encoded as discussed herein. Notably, image plane estimation 116 includes amplitude and phase planes such that neither is normalized and image plane estimation 116 indicates an expected image to be generated at an image plane based on phase only diffraction pattern image 115 and the holographic imaging arrangement being implemented.

In some embodiments, forward propagation model module 108 applies a forward propagation model as shown in Equation (3):

$$g'_n = FT(h_n) \tag{3}$$

where $h_n$ is phase only diffraction pattern image 115, FT is the forward propagation model, and $g'_n$ is image plane estimation 116.

Image plane estimation 116 is received by amplitude error adaptation module 105, which applies an amplitude error adaptation constraint to image plane estimation 116 to generate image plane output 117. For example, image plane output 117 may be characterized as an amplitude adjusted image plane output, an amplitude adjusted image plane image, etc. Image plane output 117 is determined by replacing an amplitude plane of image plane estimation 116 (i.e., the current phase and amplitude image plane estimation) with a next target amplitude image. The next target amplitude image is a sum of target holographic image 111 and a product of feedback strength 118 and a correction term that is a difference between target holographic image 111 and the amplitude of image plane estimation 116 (i.e., the current phase and amplitude image plane).

In some embodiments, amplitude error adaptation module 105 replaces amplitude plane of image plane estimation 116 as shown in Equations (4):

$$g_n = G_n \frac{g'_n}{|g'_n|} \tag{4}$$

$$G_n = G_0 + (G_0 - |g'_n|)k$$

where $g'_n$ is image plane estimation 116, $G_n$ is the next target amplitude image, $g_n$ is image plane output 117, k is feedback strength 118, and $G_0$ is target holographic image 111. As shown, an amplitude plane of the current phase and amplitude image plane estimation (image plane estimation 116) is replaced with a next target amplitude image that is a sum of target holographic image 111 and a product of feedback strength 118 and a correction term that is a difference between target holographic image 111 and the current amplitude image plane (image plane estimation 116) to generate a current amplitude adjusted image or current amplitude adjusted image plane output 117. Herein, $G_0 - |g'_n|$ is characterized as a correction term (or error term) and $(G_0 - |g'_n|)k$ is characterized as an adaptation (or adjustment) to target holographic image 111 to generate a next target amplitude plane or image.

In a next iteration, current amplitude adjusted image plane output 117 is then provided to inverse propagation model module 102, SLM constraints module 103, forward propagation model module 108, and amplitude error adaptation module 105, and so on to generate more refined holographic image plane estimations 113, phase only diffraction pattern images 115, image plane estimations 116, and current amplitude adjusted image plane outputs 117. Such iterative processing may be completed after a preset number of iterations or a particular error with respect to target holographic image 111 has been attained. It is noted that a preset number of iterations is often preferred to provide consistency with a given compute budget.

The resultant final phase only diffraction pattern image 114 corresponding to the final iteration is then provided to SLM 104 (either at a local device or remotely) for presentation as discussed herein to generate a corresponding holographic image.

The discussed techniques provide automatically selected and adaptive feedback strength 118 based on application of a DNN to target holographic image 111 for improved iterative hologram computation. In comparison to techniques where no feedback is applied, an improvement of 50% fewer iterations to attain the same error are observed. Furthermore, in comparison to constant feedback strength techniques (e.g., a constant k=0.5), the discussed selection techniques provide optimal feedback strength based on the characteristics (e.g., image class) of target holographic image 111. Notably, in some context, constant feedback strength techniques can provide decreased convergence performance for some image classes.

Discussion now turns to automatic and adaptive feedback strength generation in the context of multi-color channel holographic imaging. Notably, the discussed iterative processing and DNN pretraining techniques may be adapted to such multi-color channel holographic image processing. For example, target holographic image 111 may include multiple color planes and applying one or more DNNs may generate a feedback strength value for each color plane such that an iterative propagation feedback model is applied based on each second color plane and corresponding feedback strength value.

Figure 5:
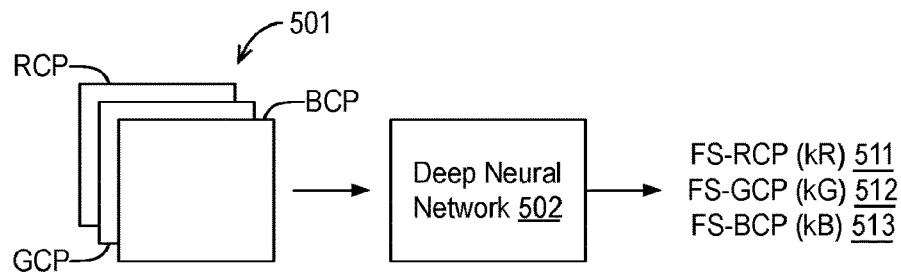
FIG. 5 illustrates exemplary implementation of a single deep neural network to generate multiple feedback strength values based on a multi-color channel input volume corresponding to a target holographic image.

FIG. 5 illustrates exemplary implementation of a single DNN 502 to generate multiple feedback strength values 511, 512, 513 based on a multi-color channel input volume 501 corresponding to a target holographic image, arranged in accordance with at least some implementations of the present disclosure. As shown in FIG. 5, in some embodiments, target holographic image 111 may include multiple color channels as represented by multi-color channel input volume 501 and including a red color plane (RCP), a green color plane (GCP), and a blue color plane (BCP). Furthermore, single DNN 502 is pretrained to generate a three value array or vector including a feedback strength for the red color plane 511 (kR), a feedback strength for the green color plane 512 (kG), and a feedback strength for the blue color plane 513 (kB), which may have any characteristics as discussed with respect to feedback strength 118.

For example, single DNN 502 is pretrained using the techniques discussed with respect to process 400 modified in that the training corpus includes target holographic image with multiple color image planes and, for each color plane, an optimal feedback strength is generated. Furthermore, the architecture of the DNN may be defined to provide an output, from the fully connected layer(s), that includes three feedback strength values. Single DNN 502 may be optionally compressed as discussed and implemented by DNN module 106.

Figure 6:
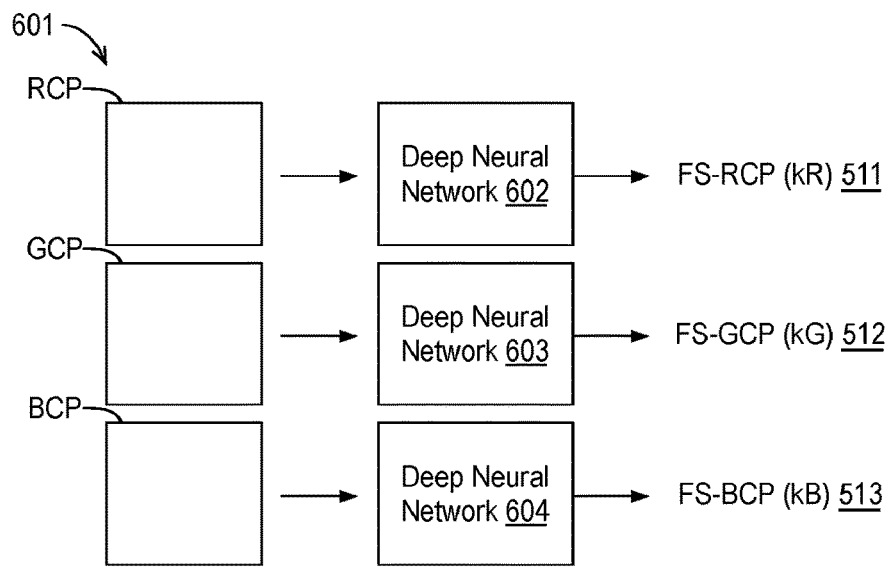
FIG. 6 illustrates exemplary implementation of multiple deep neural networks to generate multiple feedback strength values based on a multi-color target holographic image.

FIG. 6 illustrates exemplary implementation of multiple DNNs 602, 603, 604 to generate multiple feedback strength values 511, 512, 513 based on a multi-color target holographic image 601, arranged in accordance with at least some implementations of the present disclosure. As shown in FIG. 6, in some embodiments, target holographic image 111 may again include multiple color channels with a red color plane (RCP), a green color plane (GCP), and a blue color plane (BCP) as shown with respect to multi-color target holographic image 601. However, in the context of FIG. 6, the multiple color channels may be separated and provided to respective DNNs 602, 603, 604. Respective DNNs 602, 603, 604 generate, for each of the color planes, a corresponding one of feedback strength for the red color plane 511 (kR), feedback strength for the green color plane 512 (kG), and feedback strength for the blue color plane 513 (kB).

For example, each of DNNs 602, 603, 604 are pretrained using the techniques discussed with respect to process 400 modified in that each has a training corpus including target holographic images for the respective color plane and, for each color plane, an optimal feedback strength is generated. Each of DNNs 602, 603, 604 is then separately trained to generate an optimal feedback strength for the corresponding color plane (i.e., DNN 602 generates feedback strength for the red color plane 511, DNN 603 generates feedback strength for the green color plane 512, and DNN 604 generates feedback strength for the blue color plane 513) Furthermore, one or more of DNNs 602, 603, 604 may be optionally compressed as discussed herein and implemented by DNN module 106.

In either case, feedback strength for the red color plane 511 (kR), feedback strength for the green color plane 512 (kG), and feedback strength for the blue color plane 513 (kB) are generated, one each for the RCP, the GCP, and the BCP of multi-color channel target holographic image 111. Although discussed with respect to a RCP, a GCP, and a BCP (e.g., an RGB image space), any suitable color space may be implemented.

Figure 7:
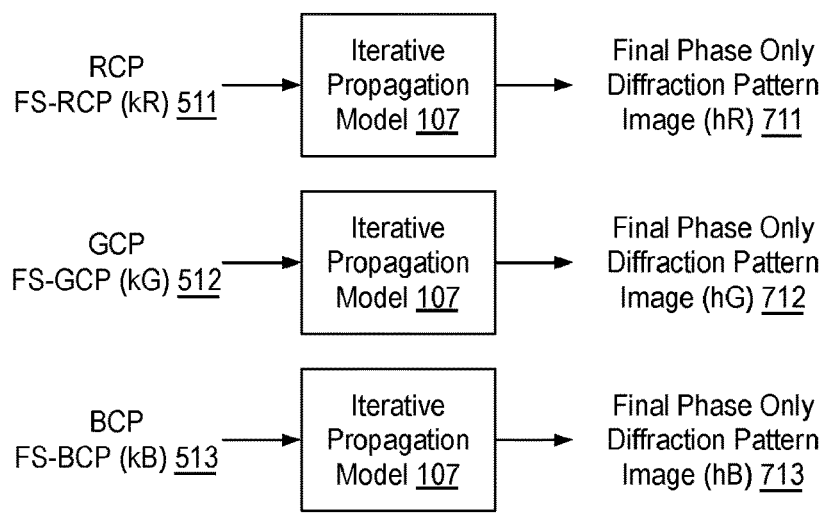
FIG. 7 illustrates exemplary iterative processing for multiple color channel target holographic images using per color channel feedback strengths.

FIG. 7 illustrates exemplary iterative processing for multiple color channel target holographic images using per color channel feedback strengths, arranged in accordance with at least some implementations of the present disclosure. As shown in FIG. 7, for each color channel of the target holographic image represented by multi-color channel input volume 501 or multi-color target holographic image 601, each color plane is paired with the corresponding feedback strength such that the RCP is paired with feedback strength for the red color plane 511, the GCP is paired with feedback strength for the green color plane 512, and the BCP is paired with feedback strength for the blue color plane 513.

Each pair is then provided to a respective iterative propagation model module 107 that applies an iterative propagation feedback model or iterative propagation model with feedback as discussed herein to generate respective final phase only diffraction pattern images 711, 712, 713 such that phase only diffraction pattern image 711 is for the red channel (hR), phase only diffraction pattern image 712 is for the green channel (hG), and phase only diffraction pattern image 713 is for the red channel (hB). Such phase only diffraction pattern images 711, 712, 713 may then be presented at a holographic plane of SLM 104 in a time multiplexed fashion to generate a color hologram at an image plane for viewing by a user, presented at different SLMs to generate the color hologram, or the like.

Discussion now turns to automatic and adaptive feedback strength generation based on both target holographic image 111 and the number of iterations that are going to be implemented in generating final phase only diffraction pattern image 114 using the feedback strength. Notably, depending on the number of iterations to be implemented, the optimal feedback strength may vary such that different feedback strengths are used for fewer iterations with respect to more iterations or a medium number of iterations. For example, an optimal feedback strength can depend on the target number of iterations. Such numbers of iterations may depend on available compute budget, but exemplary number of iterations ranges include 5 to 10 iterations for low iteration implementations, 11 to 20 iterations for medium iterations implementations, and 21 to 50 iteration implementations. However, any number of ranges and numbers of iterations in such ranges may be used. In an embodiment, three ranges of the following number of iterations are used: 5 to 15, 16 to 30, and 31 to 60. For example, a DNN may be applied to an input including target holographic image 111 and a number of iterations such that application of the DNN to target holographic image 111 and a first number of iterations generates a feedback strength and application of the DNN to target holographic image 111 and a second number of iterations generates a different feedback strength.

Figure 8:
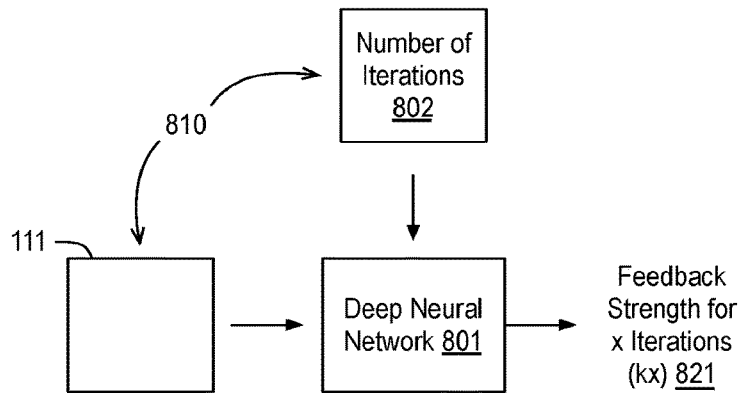
FIG. 8 illustrates exemplary implementation of a deep neural network to generate a feedback strength dependent both on a target holographic image and a number of iterations to be implemented.

FIG. 8 illustrates exemplary implementation of a DNN 801 to generate a feedback strength dependent both on target holographic image 111 and a number of iterations 802 to be implemented, arranged in accordance with at least some implementations of the present disclosure. As shown in FIG. 8, in some embodiments, target holographic image 111 is fed into DNN 801, which generates intermediate feature representation of target holographic image 111. The number of iterations 802 may be combined with this feature representation before the last fully connected layer of DNN 801 to jointly predict the feedback strength 821. However, target holographic image 111 and number of iterations 802 may be combined in any manner to generate input volume 810.

Furthermore, number of iterations 802 may be any suitable data structure indicative of a number of iterations to be run in the iterative processing with feedback. In some embodiments, number of iterations 802 is a number equal to the number of iterations. In other embodiments, the actual number of iterations may be mapped to a low, medium, high value or the like such that a range of numbers of iterations may be collapsed to a value representative of the range. For example, for any number iterations numbers in the range of 5 to 15, a value of 1 may be provided, for any number iterations numbers in the range of 16 to 30, a value of 2 may be provided, for any number iterations numbers in the range of 31 to 50, a value of 3 may be provided, and so on. For example, number of iterations 802 may be representative of a range of iteration values for the sake of simplicity of implementation.

As shown, DNN 801 receives input volume 810 and generates a feedback strength 821 corresponding to number of iterations 802 (i.e., feedback strength 821 for x iterations (kx) 821). DNN 801 may have any characteristics discussed with respect to FIG. 3 and elsewhere herein. For example, DNN 801 is pretrained using the techniques discussed with respect to process 400 modified in that, for any number of holographic images of the training corpus, an optimal feedback strength is generated for each of a number of iterations. For example, the optimal feedback strength is the feedback strength that provides the lowest error after the corresponding number of iterations. Notably, for each holographic image of the training corpus, a number of training sets including the holographic image, a particular one of any number (e.g., N) of iterations, and a corresponding feedback strength are generated such that, for each holographic image, N training sets may be generated. As discussed, the architecture of DNN 801 may be defined to provide an output, from the fully connected layer(s), that includes a single feedback strength value corresponding to input volume 810, which in turn includes target holographic image 111 and number of iterations 802. DNN 801 may be optionally compressed.

DNN 801 is then implemented DNN module 106, which takes as input target holographic image 111 and number of iterations 802. Number of iterations 802 may be provided from a user, an application layer, or it may be determined based on computational availability via a look up table or the like. DNN 801 then provides feedback strength 821, which may be implemented by iterative propagation model module 107 as discussed with respect to feedback strength 118.

Discussion now turns to automatic and adaptive feedback strength generation using target holographic image 111 to generate multiple feedback strengths for use at different iteration sets or intervals of implementation of the iterative propagation feedback model or iterative propagation model with feedback. Notably, faster convergence may be accomplished when different feedback strengths are used at different iterations of the iterative propagation model. For example, for, temporally, a first feedback strength may be used for a first set of iterations, a second feedback strength may be used for a second set of iterations, a third feedback strength may be used for a third set of iterations, and so on. Although discussed with respect to different feedback strengths for different sets of iterations (i.e., a set of iterations being a consecutive number of iterations), different feedback strengths may be used for each iteration. Notably, improved convergence may be provided using such differing feedback strengths with the feedback strengths being based on target holographic image 111. For example, application of a DNN based on target holographic image 111 may generate first and second feedback strength values that are to be used for different sets or sequences of iterations of the iterative propagation feedback model.

Figure 9:
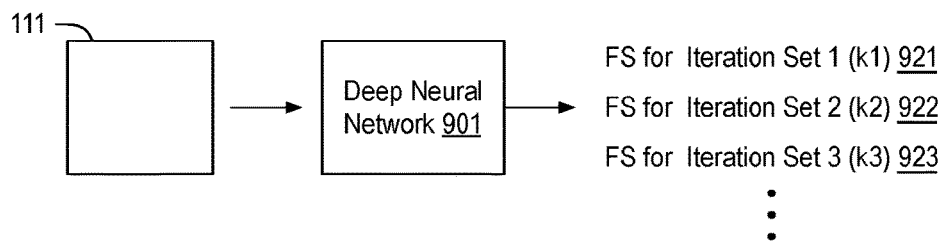
FIG. 9 illustrates exemplary implementation of a deep neural network to generate multiple feedback strengths for uses at differing iterations of an iterative propagation model.

FIG. 9 illustrates exemplary implementation of a DNN 901 to generate multiple feedback strengths for uses at differing iterations of an iterative propagation model, arranged in accordance with at least some implementations of the present disclosure. As shown in FIG. 9, in some embodiments, target holographic image 111 is received by DNN 901, which generates multiple feedback strengths: a feedback strength for a first iteration set 921 (k1), a feedback strength for a second iteration set 922 (k2), a feedback strength for a third iteration set 923 (k3), and so on. As discussed, in implementation, feedback strength for a first iteration set 921 may be used for a first set of iterations (e.g., iterations 1 to 5) or a first iteration only, feedback strength for a first iteration set 922 may be used for a second set of iterations (e.g., iterations 6 to 10) or a second iteration only, feedback strength for a third iteration set 923 may be used for a third set of iterations (e.g., iterations 11 to 20) or a third iteration only, and so on.

Each feedback strength may be used for any number of iterations and such numbers of iterations may be the same (e.g., 1, 5 or 10) or they may be different. For example, DNN 901 is pretrained using the techniques discussed with respect to process 400 modified in that, for each holographic image of the training corpus, multiple optimal feedback strengths are generated, one each for sets of iterations to be implemented sequentially by iterative propagation model module 107. For example, an architecture may be defined for implementation by iterative propagation model module 107 such that the iterative propagation feedback model or iterative propagation model with feedback is to implement a first feedback strength for a first set of iterations or a first iteration, a second feedback strength for a second set of iterations or a second iteration, and so on. Based on the architecture and the target holographic image, an optimal feedback strength for each of the sets of iterations is then determined. DNN 901, having an architecture to output a corresponding number of feedback strengths, is then trained as discussed herein. As discussed, DNN 901, in implementation, then generates multiple feedback strengths 921, 922, 923 for implementation as discussed below with respect to FIG. 10. For example, a sequence of 20 total iterations may be split into four sequences of 5 iterations each with a different feedback strength being implemented for each sequence (i.e., k1 is used for iterations 1 to 5, k2 is used for iterations 6 to 10, k3 is used for iterations 11 to 15, and k4 is used for iterations 16 to 20). Any number of total iterations may be spilt into any number of sequences having the same or different numbers of iterations therein. DNN 901 is then implemented DNN module 106, which takes as input target holographic image 111 and outputs feedback strengths 921, 922, 923.

Figure 10:
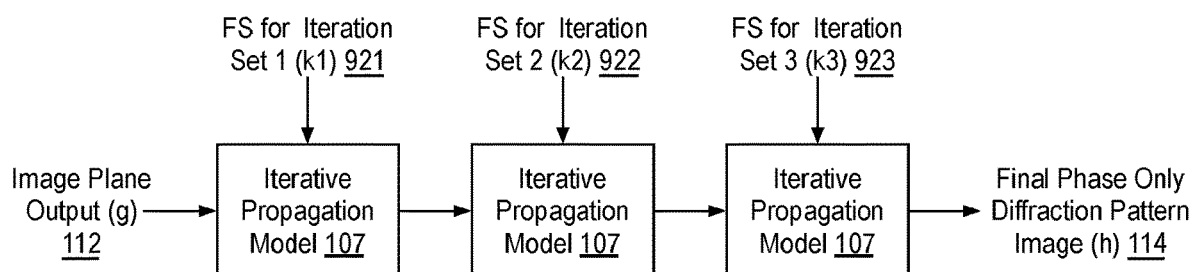
FIG. 10 illustrates exemplary iterative processing using multiple feedback strengths each for a set or sequence of iterations.

FIG. 10 illustrates exemplary iterative processing using multiple feedback strengths 921, 922, 923 each for a set or sequence of iterations, arranged in accordance with at least some implementations of the present disclosure. As shown in FIG. 10, iterative propagation model module 107 receives initialized image plane output 112 (or image plane output 117 at subsequent iterations) and feedback strengths 921, 922, 923. For a first set or sequence of iterations, iterative propagation model module 107 implements feedback strength 921, for a second set or sequence of iterations, iterative propagation model module 107 implements feedback strength 922, for a third set or sequence of iterations, iterative propagation model module 107 implements feedback strength 923, and so on, to generate final phase only diffraction pattern image 114. For example, a particular number of iterations may be set and divided into any number of sets or sequences. During implementation of each set or sequence of iterations, feedback strengths 921, 922, 923, and so on, are implemented in turn for providing feedback as discussed herein.

As shown, after each set or sequence of iterations, processing continues in a next set or sequence of iterations through the generation of final phase only diffraction pattern image 114. In some embodiments, each set or sequence of iterations implements the same iterative propagation model. In other embodiments, one or more of the iterative propagation models may be different using differing propagation models at different stages, for example.

Figure 11:
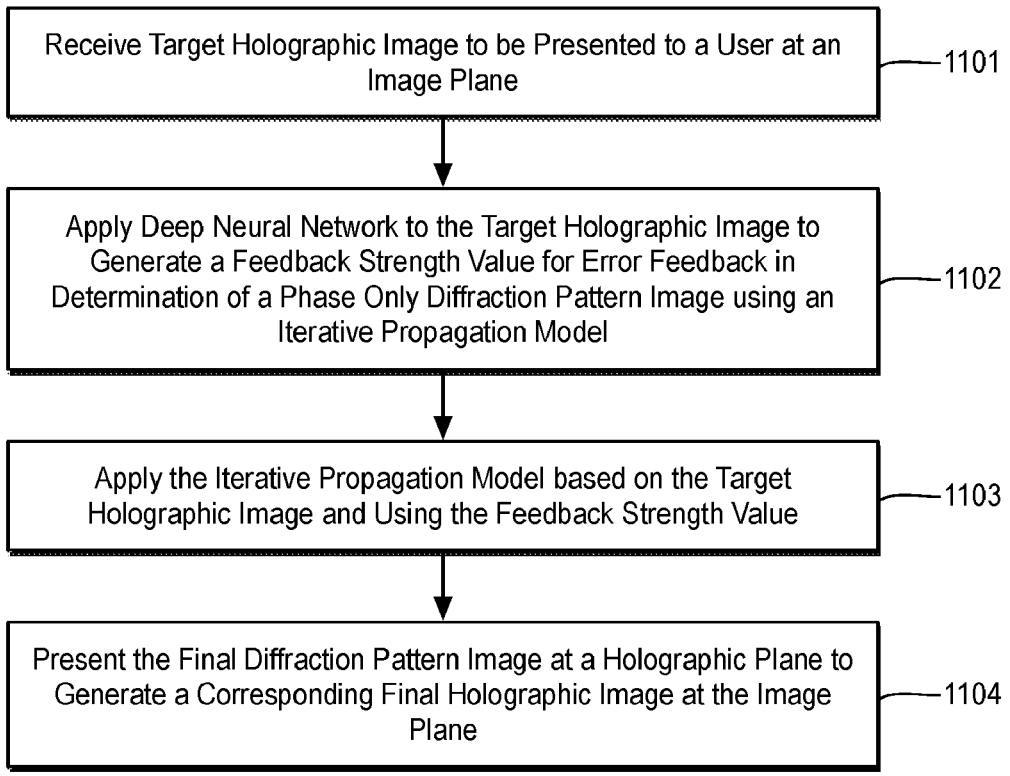
FIG. 11 is a flow diagram illustrating an example process for generating holographic images.

FIG. 11 is a flow diagram illustrating an example process 1100 for generating holographic images, arranged in accordance with at least some implementations of the present disclosure. Process 1100 may include one or more operations 1101-1104 as illustrated in FIG. 11. Process 1100 may form at least part of a holographic imaging process. By way of non-limiting example, process 1100 may form at least part of a holographic imaging process performed by system 100 as discussed herein. Furthermore, process 1100 will be described herein with reference to system 1200 of FIG. 12.

Figure 12:
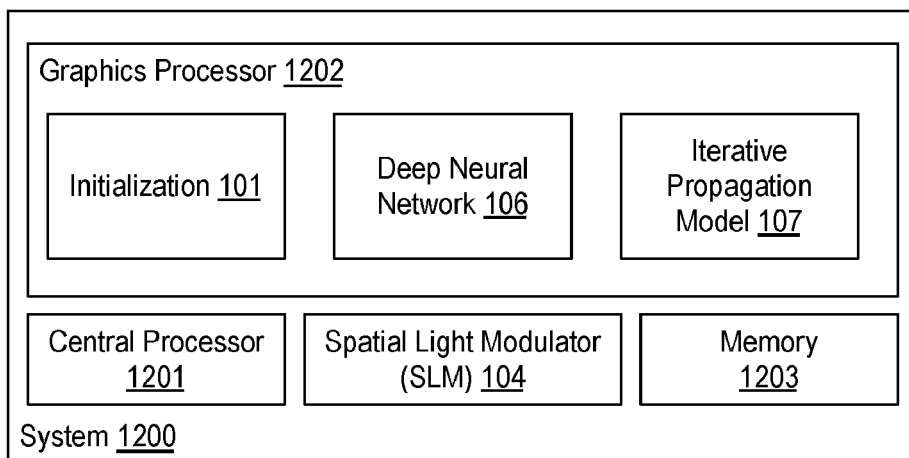
FIG. 12 is an illustrative diagram of an example system for generating holographic images.

FIG. 12 is an illustrative diagram of an example system 1200 for generating holographic images, arranged in accordance with at least some implementations of the present disclosure. As shown in FIG. 12, system 1200 includes one or more central processing units 1201 (i.e., central processor (s)), a graphics processing unit 1202 (i.e., graphics processor), memory stores 1203, and SLM 104 or another holographic imaging device. Also as shown, graphics processing unit 1202 may include or implement initialization module 101, deep neural network module 106, and iterative propagation model module 107. Such modules may be implemented to perform operations as discussed herein. In the example of system 1200, memory stores 1203 may store target holographic images or image data, multi-channel image data, feedback strengths, diffraction pattern image data, image plane output data, amplitude adjusted images or image data, image plane estimation data, holographic plane estimation data, DNN parameters, propagation model parameters, or any other data or data structure discussed herein.

As shown, in some examples, initialization module 101, deep neural network module 106, and iterative propagation model module 107 are implemented via graphics processing unit 1202. In other examples, one or more or portions of initialization module 101, deep neural network module 106, and iterative propagation model module 107 are implemented via central processing units 1201 or an image processing unit (not shown) of system 1200. In yet other examples, one or more or portions of initialization module 101, deep neural network module 106, and iterative propagation model module 107 are implemented via an imaging processing pipeline, graphics pipeline, or the like.

Graphics processing unit 1202 may include any number and type of graphics processing units that may provide the operations as discussed herein. Such operations may be implemented via software, hardware, or a combination thereof. For example, graphics processing unit 1202 may include circuitry dedicated to manipulating holographic image data, DNN data, etc. obtained from memory stores 1203. Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory. In an embodiment, one or more or portions of initialization module 101, deep neural network module 106, and iterative propagation model module 107 are implemented via an execution unit (EU) of graphics processing unit 1202. The EU may include, for example, programmable logic or circuitry such as a logic core or cores that may provide a wide array of programmable logic functions. In an embodiment, one or more or portions of 2 initialization module 101, deep neural network module 106, and iterative propagation model module 107 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of initialization module 101, deep neural network module 106, and iterative propagation model module 107 are implemented via an application specific integrated circuit (ASIC). The ASIC may include an integrated circuitry customized to perform the operations discussed herein.

Returning to discussion of FIG. 11, process 1100 begins at operation 1101, where a target holographic image to be presented to a user at an image plane is received. The target holographic image may include any data structure representative of a target holographic image. In some embodiments, the target holographic image may be characterized as target holographic image data. For example, the target holographic image represents a holographic image to be presented to a user at an image plane within a holographic imaging arrangement.

Processing continues at operation 1102, where a deep neural network is applied to the target holographic image to generate a feedback strength value for error feedback in determination of a phase only diffraction pattern image using an iterative propagation feedback model such that the phase only diffraction pattern image is for presentation at a holographic plane to generate a corresponding holographic image at the image plane. As discussed herein, the feedback strength value is generated using a deep neural network such that the feedback strength or feedback strength value is responsive to the characteristics of the target holographic image. The feedback strength value may be suitable to any iterative propagation feedback model. Furthermore, the deep neural network may have any suitable architecture. In some embodiments, the deep neural network includes one or more convolutional layers each to generate a plurality of feature maps based on the target holographic image or preceding feature maps and a fully connected layer following the convolutional layers to generate the feedback strength value. In some embodiments, the deep neural network corresponds to a pretrained deep neural network and the deep neural network has one of fewer convolutional kernels with respect to the pretrained deep neural network or a reduced bit depth of weights of the deep neural network with respect to the pretrained deep neural network. In some embodiments, the target holographic image is downsampled prior to application of the deep neural network. Such techniques may provide less computational requirements, smaller memory footprint, and reduced implementation times in generating the feedback strength value.

Processing continues at operation 1103, where the iterative propagation feedback model is applied based on the target holographic image and using the feedback strength value to generate a final phase only diffraction pattern image for presentation at the holographic plane. The iterative propagation feedback model may include any suitable model with feedback. In some embodiments, applying the iterative propagation feedback model based on the target holographic image data and using the feedback strength value includes receiving a current phase and amplitude image plane estimation and replacing an amplitude plane of the current phase and amplitude image plane estimation with a next target amplitude image comprising a sum of the target holographic image and a product of the feedback strength value and a correction term comprising a difference between the target holographic image and the current phase and amplitude image plane to generate a current amplitude adjusted image. In some embodiments, applying the iterative propagation feedback model based on the target holographic image data and using the feedback strength value further includes applying an inverse propagation model to a previous amplitude adjusted image to generate a phase and amplitude holographic plane estimation, normalizing an amplitude plane of the phase and amplitude holographic plane estimation to generate a phase only diffraction pattern image, and applying a forward propagation model to the phase only diffraction pattern image to generate the current phase and amplitude image plane estimation.

In some embodiments, the target holographic image includes first and second color planes and applying the deep neural network to the target holographic image generates the feedback strength value for the first color plane and a second feedback strength value for the second color plane, and process 1100 further includes applying the iterative propagation feedback model based on the second color plane of the target holographic image and using the second feedback strength value to generate a second final phase only diffraction pattern image for presentation at the holographic plane or a second holographic plane. In some embodiments, the target holographic image includes first and second color planes and a second deep neural network is applied to the second color plane to generate a second feedback strength value, and process 1100 further includes applying the iterative propagation feedback model based on the second color plane of the target holographic image and using the second feedback strength value to generate a second final phase only diffraction pattern image for presentation at the holographic plane or a second holographic plane.

In some embodiments, applying the deep neural network includes applying the deep neural network to an input comprising the target holographic image and a number of iterations for application of the iterative propagation feedback model such that the feedback strength value is dependent on the number of iterations to be run by the iterative propagation feedback model. In some embodiments, process 1100 further includes applying the deep neural network to a second input comprising the target holographic image and a second number of iterations for application of the iterative propagation feedback model, the second number of iterations being fewer than the number of iterations, to generate a second feedback strength value.

In some embodiments, applying the deep neural network further generates a second feedback strength value such that the feedback strength value is to be used for a set of iterations of the iterative propagation feedback model and the second feedback strength value is to be used for a second set of iterations of the iterative propagation feedback model. In some embodiments, applying the iterative model includes applying the iterative propagation using the feedback strength value for a first set of iterations of the iterative model and applying the iterative propagation using the second feedback strength value for a second set of iterations of the iterative model subsequent to the first set of iterations.

Processing continues at operation 1104, where the final diffraction pattern image is presented at the holographic plane to generate a corresponding final holographic image at the image plane. In some embodiments, the iterative propagation feedback model corresponds to a holographic imaging arrangement to generate a holographic image at the image using a diffraction pattern image. In some embodiments, presenting the final diffraction pattern image at the holographic plane includes presenting the final diffraction pattern image via a spatial light modulator and process 1100 further includes projecting, via a light source, spatially coherent light onto the spatial light modulator to generate final holographic image at the image plane.

Process 1100 may provide for generating diffraction pattern image data for any number of target holographic images or target holographic image data. Process 1100 may be repeated any number of times either in series or in parallel for any number of input holographic images, input holographic images of a video sequence of holographic images, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
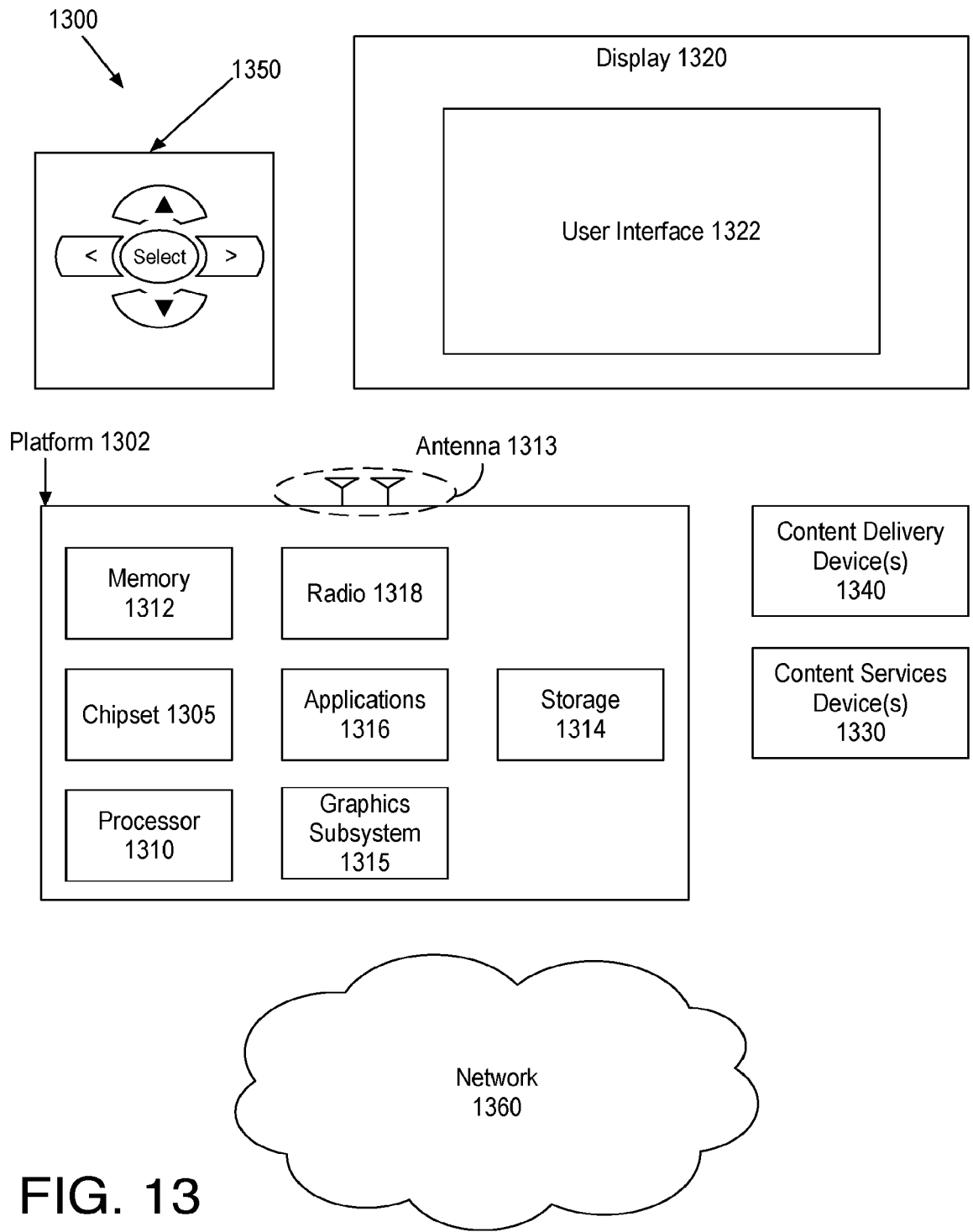
FIG. 13 is an illustrative diagram of an example system.

FIG. 13 is an illustrative diagram of an example system 1300, arranged in accordance with at least some implementations of the present disclosure. In various implementations, system 1300 may be a computing system although system 1300 is not limited to this context. For example, system 1300 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1300 includes a platform 1302 coupled to a display 1320. Platform 1302 may receive content from a content device such as content services device(s) 1330 or content delivery device(s) 1340 or other similar content sources such as a camera or camera module or the like. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still images, graphics, or video for display. Graphics subsystem 1315 may be a graphics processing unit (GPU), a visual processing unit (VPU), or an image processing unit, for example. In some examples, graphics subsystem 1315 may perform scanned image rendering as discussed herein. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any flat panel monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 13.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
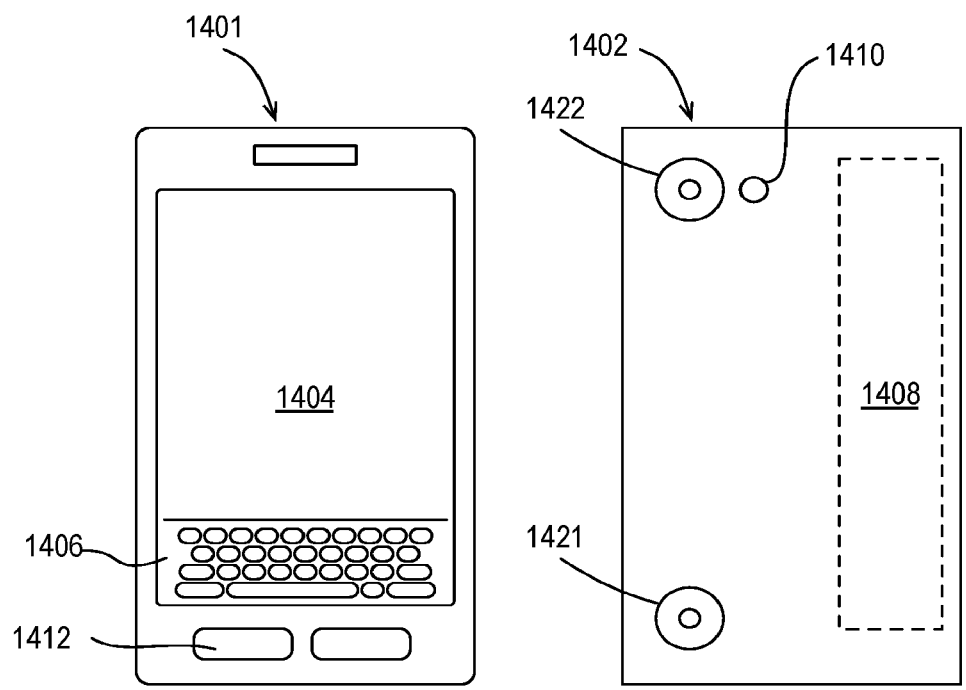
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, and an integrated antenna 1408. For example, color camera 1421 and color camera 1422 and may input image data (e.g., left and right images) as discussed herein. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data that may be processed into an image or streaming video that is output to display 1404 and/or communicated remotely from device 1400 via antenna 1408 for example. In one embodiment, the display 1404 is configured as a holographic display that is able to present holographic images using techniques described herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating holographic images comprises receiving a target holographic image to be presented to a user at an image plane, applying a deep neural network to the target holographic image to generate a feedback strength value for error feedback in determination of a phase only diffraction pattern image using an iterative propagation feedback model, the phase only diffraction pattern image for presentation at a holographic plane to generate a corresponding holographic image at the image plane, applying the iterative propagation feedback model based on the target holographic image and using the feedback strength value to generate a final phase only diffraction pattern image for presentation at the holographic plane, and presenting the final diffraction pattern image at the holographic plane to generate a corresponding final holographic image at the image plane.

In one or more second embodiments, further to the first embodiments, applying the iterative propagation feedback model based on the target holographic image data and using the feedback strength value comprises receiving a current phase and amplitude image plane estimation and replacing an amplitude plane of the current phase and amplitude image plane estimation with a next target amplitude image comprising a sum of the target holographic image and a product of the feedback strength value and a correction term comprising a difference between the target holographic image and the current phase and amplitude image plane to generate a current amplitude adjusted image.

In one or more third embodiments, further to the first or second embodiments, applying the iterative propagation feedback model based on the target holographic image data and using the feedback strength value further comprises applying an inverse propagation model to a previous amplitude adjusted image to generate a phase and amplitude holographic plane estimation, normalizing an amplitude plane of the phase and amplitude holographic plane estimation to generate a phase only diffraction pattern image, and applying a forward propagation model to the phase only diffraction pattern image to generate the current phase and amplitude image plane estimation.

In one or more fourth embodiments, further to any of the first through third embodiments, the deep neural network corresponds to a pretrained deep neural network, the deep neural network comprising at least one of fewer convolutional kernels with respect to the pretrained deep neural network or a reduced bit depth of weights of the deep neural network with respect to the pretrained deep neural network, and wherein the target holographic image is downsampled prior to application of the deep neural network.

In one or more fifth embodiments, further to any of the first through fourth embodiments, the target holographic image comprises first and second color planes and applying the deep neural network to the target holographic image generates the feedback strength value for the first color plane and a second feedback strength value for the second color plane, and the method further comprises applying the iterative propagation feedback model based on the second color plane of the target holographic image and using the second feedback strength value to generate a second final phase only diffraction pattern image for presentation at the holographic plane or a second holographic plane.

In one or more sixth embodiments, further to any of the first through fifth embodiments, applying the deep neural network comprises applying the deep neural network to an input comprising the target holographic image and a number of iterations for application of the iterative propagation feedback model.

In one or more seventh embodiments, further to any of the first through sixth embodiments, the method further comprises applying the deep neural network to a second input comprising the target holographic image and a second number of iterations for application of the iterative propagation feedback model, the second number of iterations being fewer than the number of iterations, to generate a second feedback strength value.

In one or more eighth embodiments, further to any of the first through seventh embodiments, applying the deep neural network further generates a second feedback strength value, wherein the feedback strength value is to be used for a set of iterations of the iterative propagation feedback model and the second feedback strength value is to be used for a second set of iterations of the iterative propagation feedback model.

In one or more ninth embodiments, further to any of the first through eighth embodiments, applying the iterative model comprises applying the iterative propagation using the feedback strength value for a first set of iterations of the iterative model and applying the iterative propagation using the second feedback strength value for a second set of iterations of the iterative model subsequent to the first set of iterations.

In one or more tenth embodiments, further to any of the first through ninth embodiments, the deep neural network comprises one or more convolutional layers each to generate a plurality of feature maps based on the target holographic image or preceding feature maps, and a fully connected layer, following the convolutional layers, to generate the feedback strength value.

In one or more eleventh embodiments, further to any of the first through tenth embodiments, the iterative propagation feedback model corresponds to a holographic imaging arrangement to generate a holographic image at the image plane using a diffraction pattern image, wherein presenting the final diffraction pattern image at the holographic plane comprises presenting the final diffraction pattern image via a spatial light modulator, and the method further comprises projecting, via a light source, spatially coherent light onto the spatial light modulator to generate final holographic image at the image plane.

In one or more twelfth embodiments, a device or system includes a memory and one or more processors to perform a method according to any one of the above embodiments.

In one or more thirteenth embodiments, at least one non-transitory machine readable medium includes a plurality of instructions that in response to being executed on a computing device, cause the computing device to perform a method according to any one of the above embodiments.

In one or more fourteenth embodiments, an apparatus may include means for performing a method according to any one of the above embodiments.

In one or more fifteenth embodiments, a heads up display (HUD) system includes a holographic plane and a system for generating holographic images for presentation at the holographic plane. The system includes circuitry configured to apply a machine learning model to a target holographic image to generate a feedback strength value, apply an iterative propagation feedback model based on the target holographic image and the feedback strength value to generate a phase diffraction pattern, and output the phase diffraction pattern for presentation at the holographic plane for generation of a corresponding holographic image.

It will be recognized that the embodiments are not limited to the embodiments so described, but can be practiced with modification and alteration without departing from the scope of the appended claims. For example, the above embodiments may include specific combination of features. However, the above embodiments are not limited in this regard. In various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A heads up display (HUD) system comprising:
a holographic plane; and
a system for generating holographic images for presentation at the holographic plane, the system comprising circuitry configured to:
apply a machine learning model to a target holographic image to generate a feedback strength value;

apply an iterative propagation feedback model based on the target holographic image and the feedback strength value to generate a phase diffraction pattern; and output the phase diffraction pattern for presentation at the holographic plane for generation of a corresponding holographic image.

2. The HUD system of claim 1, wherein to apply the iterative propagation feedback model based on the target holographic image and the feedback strength value, the circuitry is configured to:

receive a current phase and amplitude image plane estimation; and replace an amplitude plane of the current phase and amplitude image plane estimation with a next target amplitude image comprising:

a sum of the target holographic image and a product of the feedback strength value and a correction term comprising a difference between the target holographic image and the current phase and amplitude image plane to generate a current amplitude adjusted image.

3. The HUD system of claim 2, wherein to apply the iterative propagation feedback model based on the target holographic image and the feedback strength value, the circuitry is configured to:

apply an inverse propagation model to a previous amplitude adjusted image to generate a phase and amplitude holographic plane estimation;

normalize an amplitude plane of the phase and amplitude holographic plane estimation to generate a phase only diffraction pattern image; and apply a forward propagation model to the phase only diffraction pattern image to generate the current phase and amplitude image plane estimation.

4. The HUD system of claim 1, wherein the machine learning model corresponds to a trained neural network and the machine learning model comprises at least one of fewer convolutional kernels with respect to the trained neural network or a reduced bit depth of weights of the machine learning model with respect to the trained neural network.

5. The HUD system of claim 4, wherein the target holographic image is downsampled prior to application of the machine learning model.

6. The HUD system of claim 1, wherein the target holographic image comprises first and second color planes, and the circuitry is configured to apply the machine learning model to the target holographic image to generate the feedback strength value for the first color plane and a second feedback strength value for the second color plane.

7. The HUD system of claim 6, wherein the circuitry is further to:

apply the iterative propagation feedback model based on the second color plane of the target holographic image; and use the second feedback strength value to generate a second phase diffraction pattern for presentation at the holographic plane or a second holographic plane.

8. The HUD system of claim 1, wherein the holographic image is a three dimensional holographic image.

9. A method for generating holographic images for presentation at a holographic plane of a heads up display, the method comprising:

applying, via one or more processors, a machine learning model to a target holographic image to generate a feedback strength value;

applying an iterative propagation feedback model based on the target holographic image and the feedback strength value to generate a phase diffraction pattern; and outputting the phase diffraction pattern for presentation at the holographic plane for generation of a corresponding holographic image.

10. The method of claim 9, wherein applying the iterative propagation feedback model based on the target holographic image and the feedback strength value comprises:

receiving a current phase and amplitude image plane estimation;

replacing an amplitude plane of the current phase and amplitude image plane estimation with a next target amplitude image comprising a sum of the target holographic image and a product of the feedback strength value and a correction term comprising a difference between the target holographic image and the current phase and amplitude image plane to generate a current amplitude adjusted image;

applying an inverse propagation model to a previous amplitude adjusted image to generate a phase and amplitude holographic plane estimation;

normalizing an amplitude plane of the phase and amplitude holographic plane estimation to generate a phase only diffraction pattern image; and applying a forward propagation model to the phase only diffraction pattern image to generate the current phase and amplitude image plane estimation.

11. The method of claim 9, wherein the machine learning model corresponds to a trained neural network and the machine learning model comprises at least one of fewer convolutional kernels with respect to the trained neural network or a reduced bit depth of weights of the machine learning model with respect to the trained neural network.

12. The method of claim 11, further comprising downsampling the target holographic image prior to applying the machine learning model.

13. The method of claim 9, wherein the target holographic image comprises first and second color planes and the method further comprises applying the machine learning model to the target holographic image to generate the feedback strength value for the first color plane and a second feedback strength value for the second color plane.

14. The method of claim 13, further comprising:

applying the iterative propagation feedback model based on the second color plane of the target holographic image; and using the second feedback strength value to generate a second phase diffraction pattern for presentation at the holographic plane or a second holographic plane.

15. The method of claim 9, wherein the holographic image is a three dimensional holographic image.

16. A non-transitory machine readable medium comprising a plurality of instructions that, in response to being executed by a processor of a holographic heads up display system, causes the processor to perform operations comprising:

applying a machine learning model to a target holographic image to generate a feedback strength value;

applying an iterative propagation feedback model based on the target holographic image and the feedback strength value to generate a phase diffraction pattern for presentation at a holographic plane of the holographic heads up display system; and outputting the phase diffraction pattern for presentation at the holographic plane for generation of a corresponding holographic image.

17. The non-transitory machine readable medium as in claim 16, wherein applying the iterative propagation feedback model based on the target holographic image and the feedback strength value includes operations comprising:
  receiving a current phase and amplitude image plane estimation;
  replacing an amplitude plane of the current phase and amplitude image plane estimation with a next target amplitude image comprising a sum of the target holographic image and a product of the feedback strength value and a correction term comprising a difference between the target holographic image and the current phase and amplitude image plane to generate a current amplitude adjusted image;
  applying an inverse propagation model to a previous amplitude adjusted image to generate a phase and amplitude holographic plane estimation;
  normalizing an amplitude plane of the phase and amplitude holographic plane estimation to generate a phase only diffraction pattern image; and
  applying a forward propagation model to the phase only diffraction pattern image to generate the current phase and amplitude image plane estimation.

18. The non-transitory machine readable medium as in claim 16, wherein the machine learning model corresponds to a trained neural network, the machine learning model comprises at least one of fewer convolutional kernels with respect to the trained neural network or a reduced bit depth of weights of the machine learning model with respect to the trained neural network, and the operations further comprise downsampling the target holographic image prior to applying the machine learning model.

19. The non-transitory machine readable medium as in claim 16, wherein the target holographic image comprises first and second color planes and the operations further comprise applying the machine learning model to the target holographic image to generate the feedback strength value for the first color plane and a second feedback strength value for the second color plane.

20. The non-transitory machine readable medium as in claim 19, wherein the holographic image is a three dimensional holographic image and the operations further comprise:
  applying the iterative propagation feedback model based on the second color plane of the target holographic image; and
  using the second feedback strength value to generate a second phase diffraction pattern for presentation at the holographic plane or a second holographic plane.

* * * * *